United States Patent
Doken

(10) Patent No.: US 12,179,103 B2
(45) Date of Patent: Dec. 31, 2024

(54) SYSTEMS AND METHODS FOR ANALYZING VIDEO DATA OF PREDICTIVE MOVEMENTS

(71) Applicant: Adeia Guides Inc., San Jose, CA (US)

(72) Inventor: Serhad Doken, Bryn Mawr, PA (US)

(73) Assignee: Adeia Guides Inc., San Jose, CA (US)

( * ) Notice: Subject to any disclaimer, the term of this patent is extended or adjusted under 35 U.S.C. 154(b) by 185 days.

(21) Appl. No.: 17/700,698

(22) Filed: Mar. 22, 2022

(65) Prior Publication Data

US 2023/0302357 A1 Sep. 28, 2023

(51) Int. Cl.
| | |
|---|---|
| A63F 13/52 | (2014.01) |
| G06T 7/246 | (2017.01) |
| G06V 10/74 | (2022.01) |
| G06V 20/40 | (2022.01) |
| G06V 40/20 | (2022.01) |

(52) U.S. Cl.
CPC .............. *A63F 13/52* (2014.09); *G06T 7/246* (2017.01); *G06V 10/74* (2022.01); *G06V 20/48* (2022.01); *G06V 40/23* (2022.01); *G06F 2218/12* (2023.01); *G06T 2207/10016* (2013.01); *G06T 2207/30196* (2013.01)

(58) Field of Classification Search
CPC ........ A63F 13/52; A63F 13/428; A63F 13/46; A63F 13/65; A63F 13/213; A63F 13/812; G06T 7/246; G06T 2207/10016; G06T 2207/30196; G06V 10/74; G06V 20/48; G06V 40/23; G06V 20/40; G06F 2218/12
See application file for complete search history.

(56) References Cited

U.S. PATENT DOCUMENTS

| 7,761,892 B2 | 7/2010 | Ellis et al. | |
|---|---|---|---|
| 2012/0233105 A1* | 9/2012 | Cavallaro | A63F 13/46 703/3 |
| 2013/0190062 A1* | 7/2013 | Coulson | A63F 13/65 463/7 |
| 2016/0216770 A1* | 7/2016 | Jang | G06F 3/017 |
| 2021/0157844 A1* | 5/2021 | Andon | A63F 13/428 |
| 2022/0080260 A1* | 3/2022 | Zhang | A63B 24/0006 |

OTHER PUBLICATIONS

Dwivedi, "Analyze a Soccer game using Tensorflow Object Detection and OpenCV," https://towardsdatascience.com/analyse-a-soccer-game-using-tensorflow-object-detection-and-opencv-e321c230e8f2, Jun. 29, 2018 (6 pages).

(Continued)

*Primary Examiner* — Werner G Garner
(74) *Attorney, Agent, or Firm* — Haley Guiliano LLP

(57) ABSTRACT

Systems and methods for analyzing predictive movements are disclosed herein. In an embodiment, a system identifies an entity in a video feed of an event and generates for display a prompt for a user to perform a predictive movement to predict an action of the entity in the video feed. The system uses computer vision techniques to analyze the action taken by the entity in the video feed and the predictive movement performed by the user prior to display of the action on the user's display device. If the system determines that the predictive movement matches the action taken by the entity, the system identifies the predictive movement as a correct prediction.

20 Claims, 9 Drawing Sheets

(56) References Cited

OTHER PUBLICATIONS

Dwivedi, "Highlight Action Area in Soccer using Tensorflow," https://towardsdatascience.com/highlight-action-area-in-soccer-using-tensorflow-1c59d644b404, Jan. 2, 2019 (5 Pages).
Freeman, "Qualcomm beefs up artificial intelligence team with purchase of Twenty Billion Neurons," www.sandiegouniontribune.com/business/technology/story/2021-07-19 (5 pages).
SGB Media, "Lululemon To Acquire Mirror Fitness System For $500 Million," https://sgbonline.com/lululemon-to-buy-at-home-fitness-system-mirror-for-500-million (Jun. 29, 2020) (4 pages).

* cited by examiner

SYSTEMS AND METHODS FOR ANALYZING VIDEO DATA OF PREDICTIVE MOVEMENTS

BACKGROUND

This disclosure is generally directed to computer vision analysis of video data. In particular, methods and systems are provided for evaluating video data comprising predictive motions of a user to determine if the predictive motions match actions of an entity that are displayed after performance of the predictive motions.

SUMMARY

Live streams of events, such as physical events, including sports matches and concerts, and virtual events, including video game competitions, have increased in popularity. Often these event streams are one-sided experiences with the viewers of the streams of the events in a position of merely watching the events.

There has also been an increased desire for interactive media. Video games have increased in popularity, and interactive television shows that engage the user receive high ratings. While this interactivity has increased for stored media, live streams of media tend to lack levels of interactivity that would increase engagement and enjoyment of the media.

To address this problem, in one approach, interactivity is generated through actions taken prior to the streamed events. The interactivity may take the form of betting on outcomes of games or of fantasy sports where results of a side game are dependent on the performance of individual entities in the streamed event. While pre-event interactivity increases engagement and enjoyment with live events, there is still a distinct lack of interactivity that can increase engagement and enjoyment during the live events.

To overcome such deficiencies, methods and systems are described herein for analyzing video data of live events to generate prompts for performance of predictive movements by watchers of the live events. The generated prompts engages the viewers by prompting them to predict actions of entities on the screen by performing movements that match the actions.

The present disclosure addresses the problems of the lack of interactivity during events by generating the prompts based on entities being displayed and providing the prompts to perform the predictive movements that are then compared to actions taken by the entities. In this manner, the system increases focus on the live events as the viewers must analyze the players to determine what moves they expect the players to make and to then determine how close the viewer's movements were to the actions performed by the entities.

In one embodiment, a system identifies an entity in a video feed being transmitted to a display device. The entity may be pre-selected as an entity for which a user is to perform predictive movements, such as by a user of the display device, and/or selected by the system, such as based on a determination that the entity is about to perform an action. The system generates for display on a display device an invitation to perform a predictive movement. The predictive movement comprises one or more movements that the user of the display device predicts the entity will perform as part of the action. As an example, if the user predicts a player will dribble a ball then pass the ball to their left, the user may pantomime dribbling the ball and passing the ball to their left. The system detects performance of the predictive movement by the user and compares the predictive movement by the user to actions performed by the entity to determine whether the user correctly predicted the action of the entity.

In some embodiments, the video feed comprises a live stream of a sports events. The system may use a machine learning system to detect a plurality of motions performed by a player of the sport event during performance of the action and a machine learning system to detect a plurality of motions performed by a user when performing the predictive movements. In some embodiments, the motions are stored in tables identifying the motions, body parts, and time stamps when the motions occurred. The motions performed by the player may be compared to the motions of the user to determine whether the user correctly predicted the action of the entity.

In some embodiments, the video feed comprises a live stream of a video game. The predictive movements may comprise inputs into a video game which would cause a character in the video game to perform one or more actions. In some embodiments, the video data from the live stream of the video game is analyzed to determine actions performed by characters in the video game. In other embodiments, the system receives data identifying inputs entered by a player of the video game. The system compares the inputs of the viewer with the detected action in the video data and/or the inputs entered by the player to determine if the viewer successfully predicted an action of the entity. The entity may comprise the character in the game or the player performing the predictive action.

In some embodiments, the system generates for display a scoreboard that identifies users and, for each user, a score indicative of a number of correct predictions. The scoreboard may additionally or alternatively include a score for each user that is based on a level of similarity between the predictive movement and the action performed by the entity. In this manner, the system provides a competition venue for performing predictive motions. The system may additionally generate for display highlights comprising videos of one or more users performing the predictive movement. The highlight may be generated in response to a determination that a user's predictive movement comprises a correct prediction and/or in response to determining that a user's predictive movement is closest to an action performed by the entity.

DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
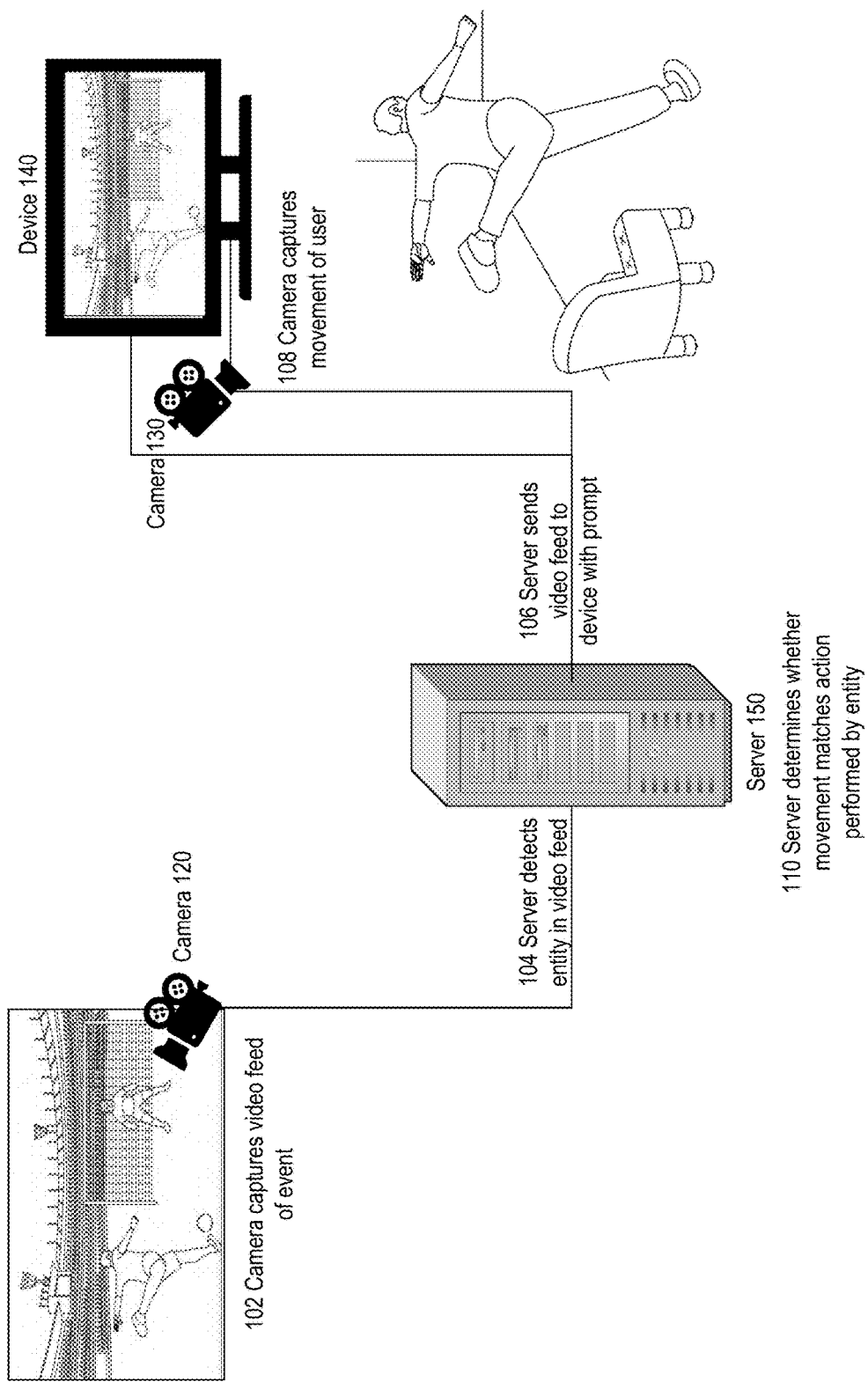
FIG. 1 depicts an example system for analyzing and matching video feed data.

FIG. 1 depicts an example system for analyzing and matching video feed data. System 100 comprises camera 120, camera 130, device 140, and server 150 communicatively coupled over one or more networks. The system of FIG. 1 is intended to provide a practical example and, in some embodiments, more, fewer, or different devices may be used to perform the methods described herein. For instance, some embodiments may include a video feed of a streamed video game instead of a video feed of an event captured by a camera, thereby utilizing a computing device to capture the video feed instead of camera 120. As another example, multiple server computers may perform different actions attributed to server 150, such as a first server computer that provides a video feed to device 140 and a second server that analyzes the video feed of the event to detect entities and/or analyze actions performed by detected entities and/or movements performed by the user. As another example, a computing device incorporating camera 120 may perform the video feed analysis techniques described herein.

Camera 120 comprises one or more video recording devices that are configured to capture a video feed. In some embodiments, camera 120 comprises a plurality of cameras that capture a video feed of the event from a plurality of angles. For example, a plurality of cameras may be configured to capture different perspectives of a soccer game, with some of the cameras comprising stationary cameras and other cameras being machine- or human-operated to follow the game and/or players.

Camera 130 comprises one or more video recording devices that are configured to capture a video feed of a user's predictive movements in a location proximate to device 140. In some embodiments, camera 130 comprises a camera that is integrated into device 140. In other embodiments, camera 130 comprises a camera that is separate from device 140 and is communicatively coupled to device 140 and/or server 150.

Device 140 comprises a display device configured to display a video feed, such as the video feed captured by camera 120 and/or a processed video feed provided by server 150. Device 140 may comprise any display device capable of receiving and displaying video data including, but not limited to, a personal computer, laptop computer, smart television, smartphone, tablet, personal digital assistant (PDA), gaming system, or other computing device configured to receive data from a server through a wired or wireless connection.

Server 150 comprises one or more computing systems configured to provide a video stream to one or more client devices, such as device 140. Server 150 may additionally be configured to analyze video data, such as video data captured by camera 120 or camera 130, to detect entities in the video data and/or detect actions or movements performed by entities or users in the video data.

Steps 102-110 comprise a method by which system 100 analyzes and compares video data received from a plurality of video sources. Steps 102-110 comprise one example of a method for identifying matching inputs, and other methods described herein comprise different steps and/or different entities performing different elements of the claims. For example, analysis of the movements captured by camera 130 may be performed partially by device 140 or other computing device.

At step 102, camera 120 captures a video feed of an event. For example, camera 120 may be a camera configured to record a live event, such as a sports game, concert, or other televised event. In some embodiments, camera 120 comprises multiple cameras that simultaneously capture videos of different angles of a same event. Camera 120 may be configured to transmit a video feed to an external computing device, such as server 150.

At step 104, server 150 detects an entity in the video feed captured by camera 120. Server 150 may be configured to identify specific entities, such as particular players on a sports team. For example, the server may be configured to identify a quarterback during a soccer game. In some embodiments, the server identifies the entity by scanning video feeds from a plurality of cameras to identify which of the video feeds contains the entity. The server may use image recognition techniques to identify the entity. For instance, the server may use computer vision software to identify players through facial recognition or unique articles of clothing, such as jersey numbers, clothing colors, or accessories, such as a team captain's armband or gloves.

At step 106, server 150 sends the video feed to device 100 with a prompt to perform an action. The video feed may comprise live and/or time-delayed footage of the event captured by one or more cameras. Additionally, server 150 sends instructions to device 140 to display a prompt to perform a predictive action. The prompt may identify the entity that was identified in the video feed captured by the camera.

At step 108, camera 130 captures a movement of a user in an area proximate to device 140. For example, the prompt displayed on device 140 may indicate a time at which to perform the predictive action, such as through a countdown timer. When the time to perform the predictive action occurs, camera 130 may capture video footage of a location proximate to device 140 where the user is performing a movement that is predictive of what the entity in the video feed is going to perform.

At step 110, server 150 determines whether the movement matches the action performed by the entity. For example, server 150 may receive further video feeds from camera 120 which show the entity performing an action. Server 150 may analyze the video feed to identify the action performed by the entity using the methods described herein. Server 150 may further analyze the video footage of the movement of the user captured by camera 130 to identify the movement performed by the user. Server 150 may compare the identified action with the identified movement to determine an extent to which the movement matches the action. If server 150 determines that the user's movement matches the action performed by the entity, server 150 may store data indicating a correct prediction by the user.

FIGS. 2A-2D are provided as an example of the methods described herein. In some embodiments, a user initially selects an entity for which actions will be predicted. For example, a prompt may be displayed on a display device that identifies a plurality of entities that will be in an event, such as an event roster. The user may select an entity from the list using any selection means, such as through a remote control. In some embodiments, the selection is performed on a separate device, such as a handheld device, that corresponds to the display device through a user account. In some embodiments, multiple selections are made, such as for one user selecting multiple players and/or for multiple users in a same location selecting different entities. For example, a first user may select a striker in a soccer game while a second user selects an opposing team's goalie. In some embodiments, prior to performance of the methods of FIGS. 2A-2D the system calibrates a user's home environment to the size of the field, thereby scaling down distances for performance of actions within a living room.

Figure 2A:
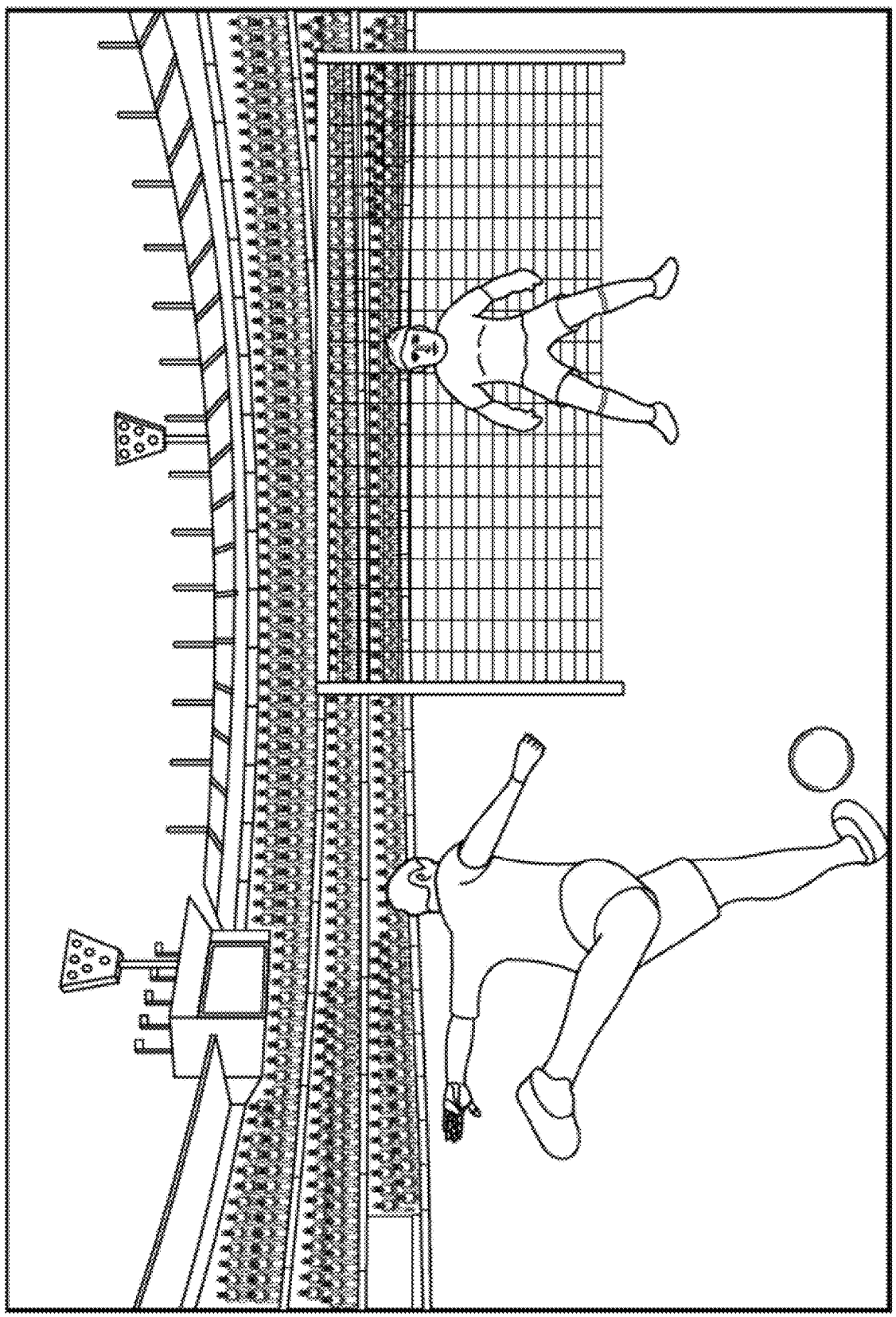
FIG. 2A depicts an example video feed including an entity performing an action.

FIG. 2A depicts an example video feed including an entity performing an action. In some embodiments, the entity comprises one or more pre-selected entities, such as entities selected by users that receive the video stream. In some embodiments, the methods described herein are performed in response to detecting a particular entity in a video feed from one or more cameras. The detection of the entity in a video feed may be used to determine which of a plurality of video feeds to provide to a user device. For example, if a user selects a particular player to follow, the system may select video feeds that include the particular player to display to the user. Thus, different video feeds may be displayed to different users based on selected entities.

In some embodiments, the system further determines that the entity is about to perform an action. For example, the system may store data indicating that a quarterback will perform an action after the beginning of a play. If the system detects the beginning of a play, such as through received data indicating the beginning of the play or pattern recognition techniques performed on video footage indicating the beginning of a play, such as when players are lined up, the system may determine that the entity is about to perform an action and perform the methods described herein in response. As another example, the system may use computer vision software to identify and track a ball of the game. When a player receives the ball, the system may determine that the player is about to perform an action.

In some embodiments, detecting a particular tracked entity comprises identifying a player through facial recognition and/or cross-referencing video feeds taken from different angles. For example, multiple video feeds of the same event may show the same entity. Based on geographical characteristics, position of the entity, and/or known locations of the cameras, the system may determine that an entity in first footage is the same entity in second footage. Thus, if facial recognition is used to identify the entity in first footage, that identification may be applied to the entity in second footage. Other methods of identifying entities may include identifying particular features associated with the entities, such as a uniform number or color, accessories, hair style, or other features unique to individual entities.

Figure 2B:
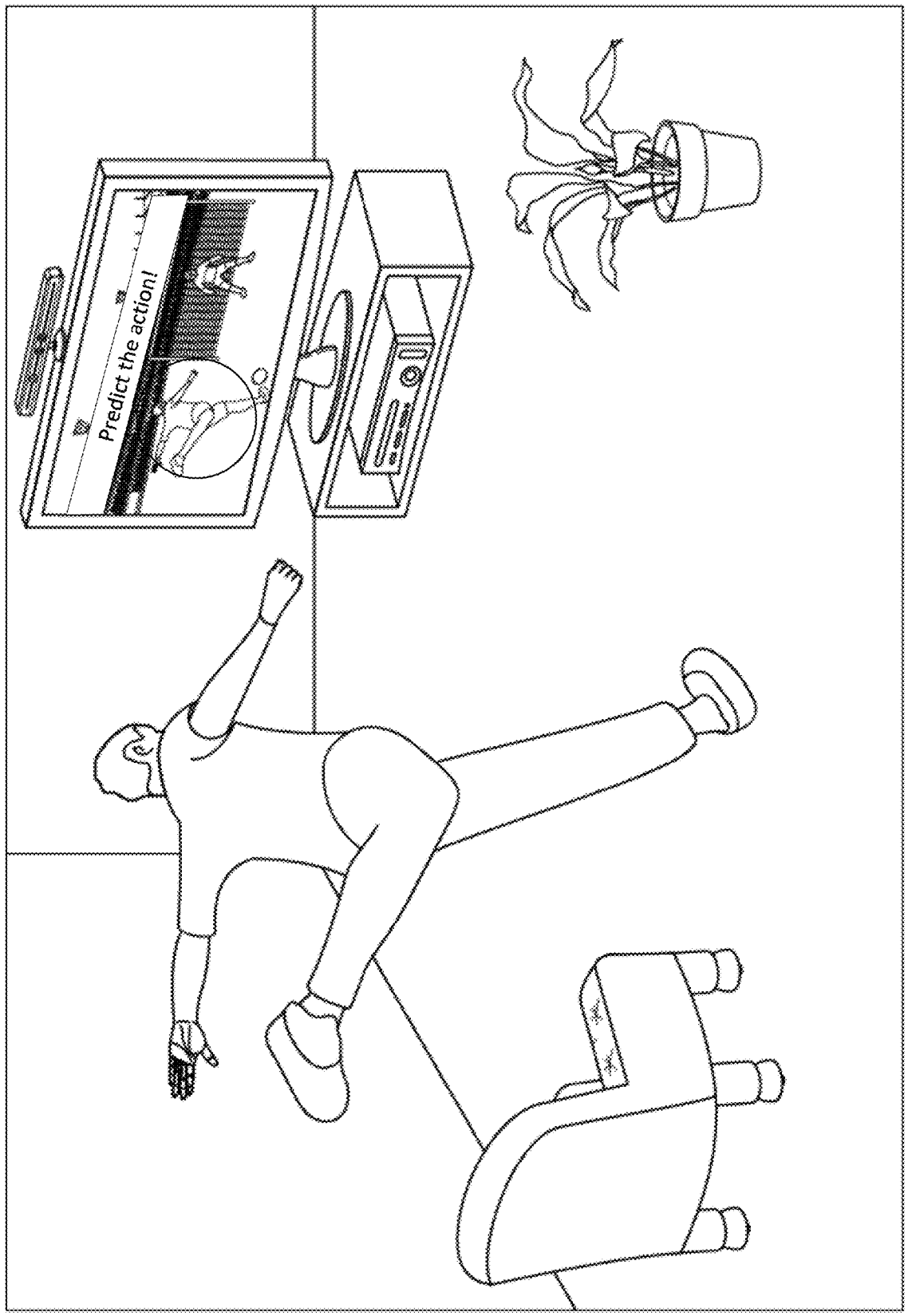
FIG. 2B depicts an example of a prompt being displayed on a user device to perform a predictive movement.

After the entity is detected, the entity is identified to a user with a prompt to perform a predictive movement. FIG. 2B depicts an example of a prompt being displayed on a user device with to perform a predictive movement. The predictive movement comprises a prediction of an action the entity will take through movement of the user's body to match the predicted action. Thus, if the user predicts that a soccer player will pass the ball to a player on his left using his right leg, the user may perform the predictive movement by kicking his right leg to the left in an imitation of the action. In FIG. 2B, the user is shown a player about to perform a goal kick and is performing a predictive movement to attempt to match the action of the player prior to performance of the action by the player.

Figure 2C:
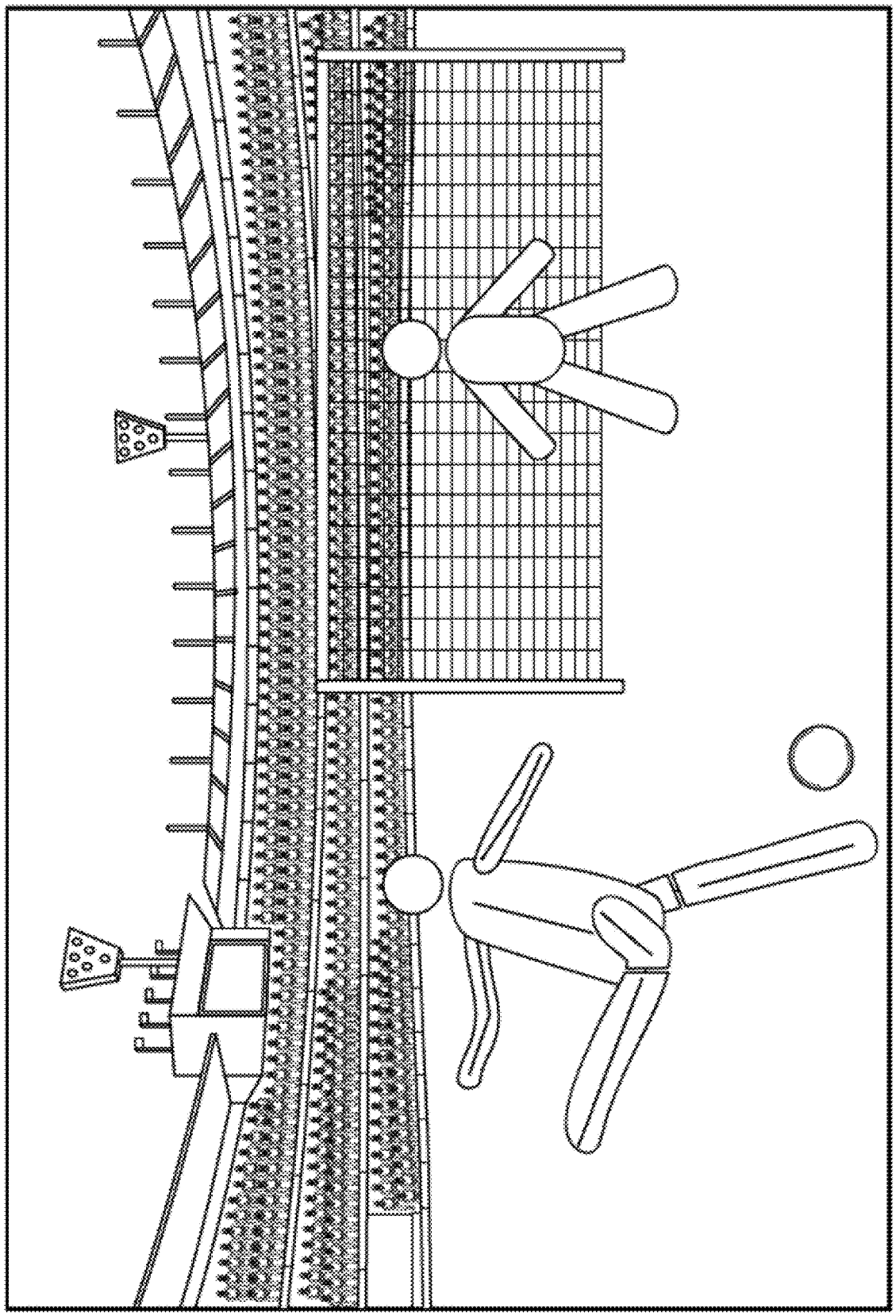
FIG. 2C depicts an example of video data of an event being analyzed to detect an action performed by the entity.

FIG. 2C depicts an example of video data of an event being analyzed to detect an action performed by the entity. In some embodiments, after the entity is detected, the system ignores other parts of the video data to focus on the action performed by entity, such as by blurring out or removing non-tracked players or auxiliary objects, thereby reducing computational load in evaluating the performed action.

In some embodiments, the analysis of the action is performed as video data is received. Thus, the system may employ a recursive algorithm to continuously analyze subsequent images as the action is performed. The following is an example of a recursive algorithm employed on subsequent images to identify an action performed by an entity. First, the system may identify the edge of the player in the received image, such as through Sobel/Scharr operators and Laplacian or distance transformations. The system may further identify contours of the image and isolate clothing, such as a jersey, socks, or shoes. Next, the system may use body part filters, such as a bilateral filter, BoxFilter, SQR-Box filter, dilation filter, or erosion filter to break down individual parts of the body. Then, using multiple images, the system may track movement of the body part along x, y, and z axes. In some embodiments, the system may use a pose estimation software tool, such as software tools available through Tensorflow, to estimate a pose of the player. Using multiple images and the locations of the body parts along the x, y, and z axes, the system may track a speed of the player and of the individual body parts.

Based on the movements of different body parts, the system may determine the motions of the entity and determine individual actions, which may include sub-actions performed by different body parts. For example, in FIG. 2C, the action of the goal kick includes sub-actions for the right and left arm swinging up and a sub action for the right foot swinging back. These sub-actions may be compared to stored primitives associated with a particular event. For instance, primitives for soccer may include dribbling of the ball with either foot, leaning, jumping, kicking the ball, or any other individual motions of body parts that occur during soccer matches.

In some embodiments, computer vision is used to identify body parts through feature descriptions, such as through SURF or RootSIFT techniques. In some embodiments, pre-defined or trained filters are used to identify action types from the movement of body parts. Training techniques may be used to increase the accuracy of the computer vision software for particular sports. Thus, one trained algorithm may be used for soccer while a second trained algorithm is used for basketball. These two algorithms may deviate in what is referred to as "dribbling," but each will provide an action description and body part that performed the action based on the video data. Video data from multiple cameras capturing the same event may further be used to increase accuracy and provide depth perception for mapping the movement of body arts in three-dimensional space.

In some embodiments, threshold mechanisms based on physical characteristics of entities, such as height or limb length, are used to determine the extent of a body motion. For example, the system may determine that a player jumped based on a detected distance between the player's feet and the ground and a determined difference between the player's current head height and the player's normal head height exceeding a threshold value. The jump height may additionally scaled based on a ratio of the player's height to a user's height. Other thresholds may be used to determine when to stop detecting portions of a player's body, such as if a leg extends beyond a threshold length of the leg.

In some embodiments, the trained system comprises a convolutional neural network trained on previous actions performed by other entities. The convolutional neural network may use patterns of the body and body part movements in several layers, such as using rough edges and curves in a first layer, body parts in a second layer, and movements in the third layer. Based on the convolutional neural network, the system may determine actions performed by different body parts. In some embodiments, a temporally sensitive model is used in addition to the convolutional neural network to identify continuous motions, such as dribbling of the ball. The convolutional neural network may be trained using previously labeled footage that identifies actions performed in the footage by different body parts in the footage. Other neural networks, such as recurrent neural networks, may be used to increase accuracy and to further train the convolutional neural network. Motion detection for the neural networks may be improved using field landmarks, such as goal posts or corner flags. In some embodiments, the models are trained to specific users using metadata from previous predictive movements performed by the users. Additionally, metadata from previous predictive movements may be used to display statistics, suggestions for improvements, or other data relating previous predictive movements.

In some embodiments, the system generates and stores a table comprising the actions performed by one or more tracked entities. The table may include a player name, body motion, and time stamp. The table may additionally include a video frame number indicating a video frame in which the action began. An example table is provided below:

| Player | Body Move | Timestamp | Frame |
|---|---|---|---|
| Messi | Left Foot Fwd | 23:12:325 | 12125 |
| Messi | Dribble to Left | 23:13:125 | 12157 |
| Messi | Left Foot Fwd, Torso Arched | 23:13:775 | 12171 |
| Messi | Right Foot Fwd, Left Arm Up | 23:14:625 | 12201 |

The body moves may be predefined moves determined based on the tracked body parts using the methods described above.

Figure 2D:
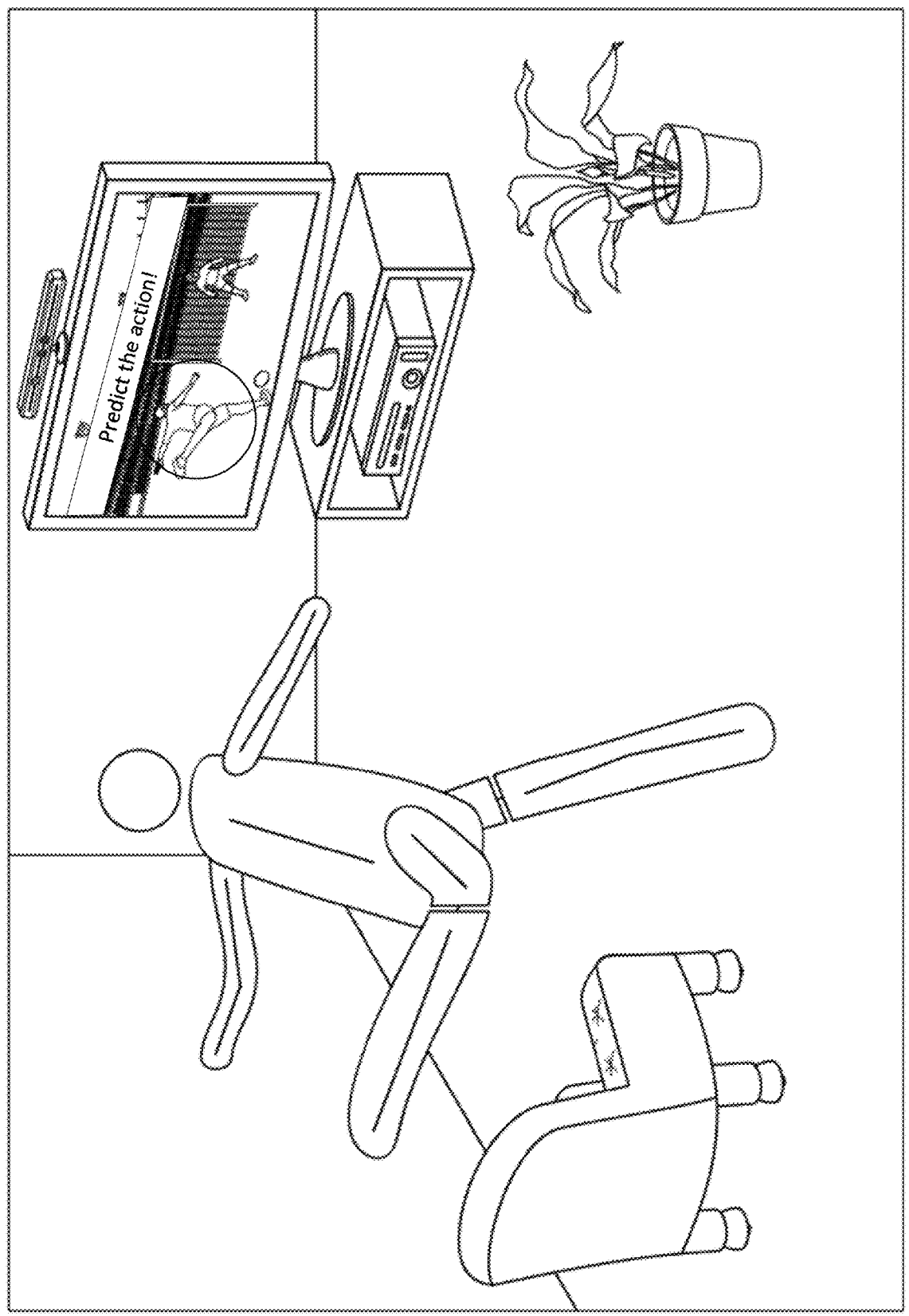
FIG. 2D depicts an example of video data of a movement being analyzed to detect a predictive movement performed by a user.

FIG. 2D depicts an example of video data of a movement being analyzed to detect a predictive movement performed by a user. Any of the previously described methods for determining an action of an entity using computer vision may be employed to determine the movement of the player, such as through a trained neural network and/or computer vision techniques. The detection of the predictive movement of the user may be performed in response to displaying the prompt and/or in response to user input indicating performance of a predictive action. For instance, if the prompt has a countdown timer, the detection of the predictive movement may be performed on footage captured after the countdown timer reaches 0.

In some embodiments, the system pauses playback of the live stream of the event while the predictive movement is performed, thereby allowing the user to finish the predictive movement prior to performance of the action by the entity. The system may then provide one or more means for catching up to the live event, such as skipping portions of commercials or other breaks, picture-in-picture of the live event with the missed portions of the event until all portions of the event prior to the live event have been displayed, or cutting parts of the live event that were identified as being removable, such as pauses between plays.

In some embodiments, if the system is unable to continue tracking the movements of the entity, such as through action results with a low level of confidence, unfavorable viewing conditions, absence of video footage with the entity, or other conditions that reduce the ability of the system to detect actions of the entity, the system may cause the display device to display a notification indicating that a predictive action can no longer be performed. Additionally or alternatively, the system may cause the display device to stop displaying a prompt to perform the action.

In some embodiments, the system determines that a predictive move has occurred only if the move is performed prior to display of the action by the entity. The system may determine that the move is performed prior to the display of the action by the entity based on stored time stamps of the action. Additionally or alternatively, the system may cause the device to pause playback of the event until the predictive movement is performed and resume playback after the predictive movement is performed.

Determining a match between the predictive movements of the user and the action of the entity may comprise determining if each part of the action of the entity was performed by the user. For example, if the entity's kicking action includes twisting a left foot, swinging a right foot back, tilting a torso forward, and then swinging the right foot forward while pulling a torso back, predictive movements performed by a first user that comprise each of the aforementioned motions may be determined to match, while predictive movements performed by a second user that comprise each motion except the twisting of the left foot may not be determined to match. Additionally or alternatively, the system may determine a percentage match of the predictive motion to the entity's actions, such as by determining a percentage to which each individual motion matches each action or determining a percentage of the parts of the action that were performed by the user. For instance, in the above example, the predictive movements of the first user may be determined to be a 100% match, while the predictive movements of the second user may be a 75% match as the second user performed three out of the four parts of the action.

In some embodiments, the system determines whether the percentage match, or other similarity score, of the predictive movement to the entity's actions is above a threshold value, such as 80%. If the percentage match or other similarity score is greater than the threshold value, the system may determine that the predictive movements of the user match the action of the entity. In some embodiments, the threshold value varies depending on skill level and/or user. For example, a skill level for a competition may be initially selected by the user. The different skill levels may correspond to different threshold percentages, such as 50% for a beginner skill level and 90% for an advanced skill level. Additionally or alternatively, the threshold value may vary based on previous actions taken by the user, with a higher threshold being set if the user has successfully performed matching predictive actions a threshold number of times.

In some embodiments, the system tracks actions of multiple entities and compares them to predictive movements of multiple users in a location proximate to the display device. For example, the system may analyze video data from the camera proximate to the display device to identify a plurality of different users, such as by using facial recognition and/or other recognition techniques described herein. The system may separately analyze the movements of the different users employing the methods described herein and compare the movements to pre-selected entities. For example, if a first user selects a kicker while the second user selects a goalie, the system may compare the movements of the first user to the actions of the kicker and compare the movements of the second user to the actions of the goalie.

In some embodiments, when multiple users in one location are compared to a plurality of entities, the system determines whether the users' movements match the actions of the entities together and stores data identifying a successful prediction of the users' movements match the actions of the entities. In other embodiments, individual determinations are made for each of the users, thereby allowing the users to compete with each other based on actions of different entities.

In some embodiments, multiple users perform predictive actions for the same entity. The multiple users may be in a same location, such as proximate to the same display device, and/or in different locations, such as proximate to different display devices. The users may thus compete with each other based on a percentage of matching and/or based on a number of correctly predicted actions. For example, during a game of football, two different users may perform predictive movements for a quarterback. When the quarterback is about to perform an action, both users may attempt to perform predictive movements. If a user gets a predictive movement correct, the user may gain one point. Additionally or alternatively, the user may be given a score based on a level of match or similarity between the predictive movements and the actions of the entity. In this manner, multiple users may compete with each other in person or online by performing predictive movements for the same entity. At the end of a game, a total score may be calculated for each user with one or more winners being determined by the total scores. In some embodiments, a score is further based on an amount of time it takes users to perform predictive movements, with faster performances garnering higher scores. Additionally or alternatively, speed of performance of the move may be used as a tie-breaker between two players with a same score.

In some embodiments, the methods described herein may be used to generate competitions amongst users performing predictive movements of different entities. For example, the system may identify different entities in an event for different users. The system may send prompts to the users to perform predictive movements for the different entities prior to performance of the actions by the entities. Based on whether the predictive movements match the actions, the system may generate scores for the different users. In some embodiments, the scores are weighted based on a number of times a predictive movement is performed. For example, if a first entity performs ten actions in a game and a second entity performs only five, the system may weigh the scores for someone performing predictive movements for the first entity lower than scores for someone performing predictive movements for the second entity.

Figure 2E:
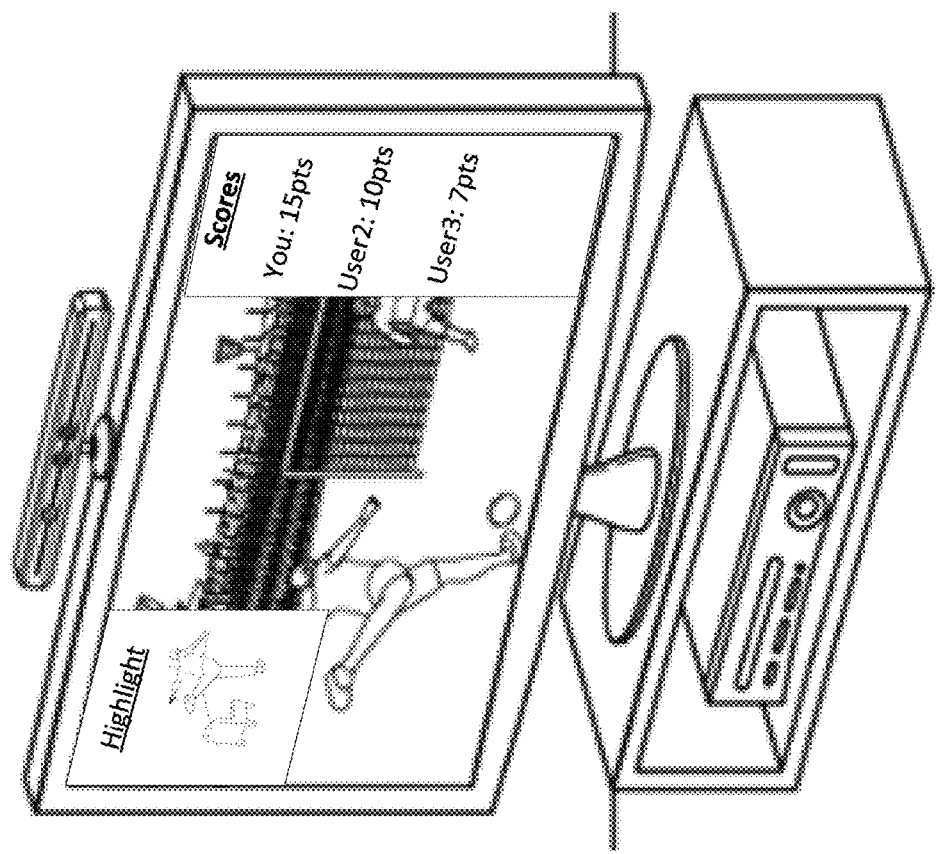
FIG. 2E depicts an example of a scored board and highlight being displayed on a user device based on predicted movements.

In some embodiments, the system causes display of a scoreboard along with the video feed of the event. The scoreboard may include usernames corresponding to different users and corresponding scores. The score may comprise a number of correctly predicted actions and/or a value based on a level of similarity between the user's movements and the performed actions. In some embodiments, a score is determined based in part on the skill level at which the predictive action is performed. For example, a matching predictive action at a beginner skill level may be worth two points while a matching predictive action at an advanced skill level is worth five points. FIG. 2E depicts an example of a scoreboard and highlight being displayed on a user device based on predicted movements.

In some embodiments, the system generates highlights of predictive movements and causes display of the highlights on different computing devices. The highlights may be selected pseudo-randomly from videos of users with correct predictions, based on a level of similarity between the user's movements and the predicted action, and/or based on a winner of a competition. The highlights may comprise videos of one or more users performing predictive movements. The system may display the highlight with a video of the entity performing the action, such as to display similarity between the highest scoring predictive movement and the action performed by the entity. In some embodiments, the system displays a video of the user performing the predictive movement and the entity performing the action on the display device proximate to the user, thereby allowing the user to see a similarity between the user's predictive movement and the action. The video may be displayed with an indication as to whether the user's predictive move was correct and/or an indication of a level of similarity between the user's predictive move and the action performed by the entity.

In some embodiments, the users select a single entity for which to perform predictive movements. In other embodiments, a single entity is assigned to the user by the system, such as through a pseudo-random selection designed to normalize a number of people performing predictive actions for different entities. In other embodiments, users may be prompted to perform predictive movements for particular types of entities or for different entities identified by the system. For instance, a user may select the role of "quarterback" and may thus perform predictive movements for quarterbacks on either team, depending on which team is on offense versus defense. As another example, the system may identify, based on stored game rules or other stored information, an entity that is about to perform an action. For instance, a basketball player that receives the ball may be selected or a soccer player that moves to a side to perform a penalty kick. The system may send the user a prompt to perform a predictive movement for that entity. If a different entity later begins to perform an action, the system may send the user a prompt to perform a predictive movement for the different entity.

In some embodiments, the system may determine a reward for performing a predictive movement that matches the action performed by the entity and/or for winning a competition comprising one or more predictions. In some embodiments, the reward may be based on a bet provided by a user. For example, the user may select an option in response to a prompt to bet a certain value on a correct prediction of the action. The bet may be against the system and/or against one or more other users. If the user performs a predictive movement that matches the action, the system may reward the user with an amount of currency based on the bet amount.

In embodiments where the user bets against other users, the system may determine a winner based on how close a predictive movement matches the actions of the entity. For instance, the system may initially determine a number of movements that match action parts. If the number is equal for multiple users, the system may determine that none of the users wins. Additionally or alternatively, the system may determine a winner based on an accuracy of how long each movement took to complete. Thus, if a kick of the entity took 0.2 seconds, the system may determine that the user who performed a kick in an amount of time closest to 0.2 seconds was the most accurate.

Embodiments above have generally been described with physical motions of a user being compared to physical actions performed by entities, with both being determined by cameras that record the movements/actions. In other embodiments, the methods described herein are applied to virtual events, such as online video games. For example the system may receive a stream of a competitive video game. The system may identify an entity pictured in the stream, based on one or more factors, such as whether the entity is alive, capable of performing an action, and/or in a position to perform the action. The system may identify the entity to a user and display a prompt to perform predictive inputs corresponding to a prediction of the inputs the competitive player will use. The system may receive a plurality of inputs from the user prior to displaying performance of the action in the streamed game. After the action is performed, the system may determine if the inputs of the user match the inputs of the action. In some embodiments, the determination is based on received data identifying the action performed. For example, a server executing the online game may track the inputs received and provide the inputs to the system to compare against the predictive inputs. In other embodiments, inputs are determined based on an analysis of video data and stored information about the game. For example, if a video game character has an ability that generates particular graphical effects on the screen, the system may identify the particular graphical effects on the screen and determine that the user performed an input that corresponds to the ability.

As a practical example of the above, a user may watch a stream of an action video game with a plurality of players. When a particular character moves onto a battlefield, the system may generate a prompt to the user to perform a predictive input. The user may select a location on a graphical user interface and two of the character's abilities, such as through a click of the mouse at the location and a selection of two keys on the keyboard. The system may store data identifying the three inputs. When the player performs the action, the player may select the location, select the first of the two abilities, and then select a different ability. In this instance, the system may determine that the first two predictive inputs were correct, but the third was incorrect. The system may determine a 66% match as two of the three predictions were correct.

As described above, the system may determine a level of matching of each of the actions. The level of matching may be based on selections of the right abilities, timings of performing the moves, and/or closeness of the location at which the moves were performed. Thus, if a first user selected a location one centimeter away from the location selected by the player and a second user selected a location two centimeters away from the location, the system may determine that the first user has a higher percentage match.

Figure 3:
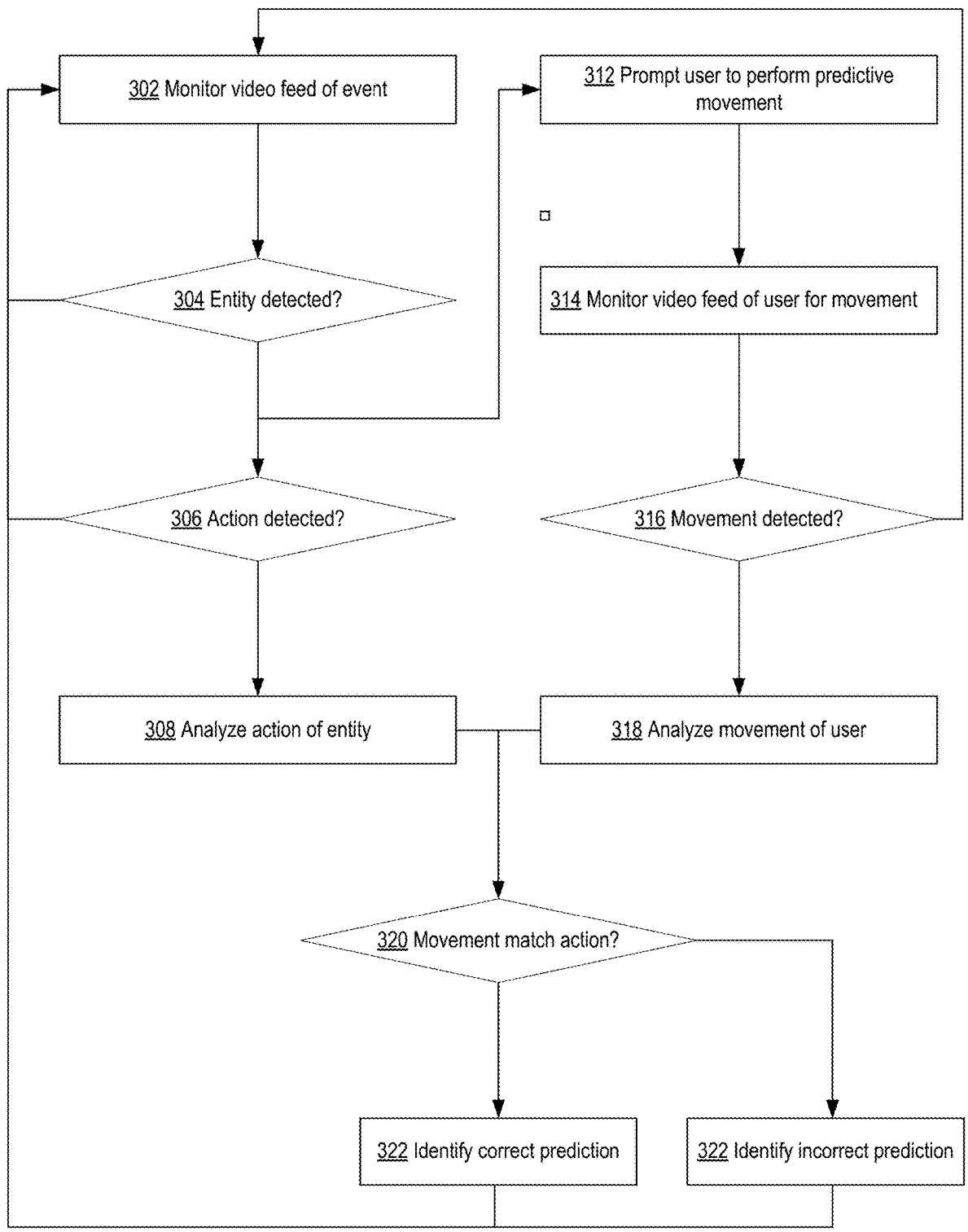
FIG. 3 depicts a flowchart of an example method for comparing predictive movements to actions performed by entities.

FIG. 3 depicts a flowchart of an example method for comparing predictive movements to actions performed by entities. While FIG. 3 is described with respect to a server computer performing the actions described herein, in other embodiments, other devices perform one or more of the steps of FIG. 3. For instance, a display device proximate to a user may perform any of the steps described herein. As an example, the method of FIG. 3 may be displayed entirely at the display device with the display device monitoring the video data as it is received or played. As another example, steps 312-318 may be performed at the user device while steps 302-308 are performed at the server computer.

At step 302, control circuitry of a server computer monitors a video feed of an event. For example, cameras located proximate to an event may capture video data of the event which is then transmitted to control circuitry of the server computer. As another example, video data generated of a digital event, such as a video game competition, may be provided to the control circuitry of the server computer. The control circuitry may analyze video data as it is received to detect one or more entities, such as pre-selected entities and/or based on a determination that the entity is about to perform an action.

At step 304, the control circuitry of the server computer determines whether an entity is detected in the video data. For example, the control circuitry may monitor one or more of a plurality of video feeds to determine whether an entity is depicted in the video feeds and/or whether an entity in the video feeds is about to perform an action. The control circuitry may perform the detection in real time, such as when video data is received of the event, to allow the control circuitry to identify the entity prior to the entity performing an action. Additionally or alternatively, the control circuitry may perform the detection of the entity after the entity has performed the action, but before performance of the action by the entity is displayed on a user display device. If an entity is not detected, the process returns to step 302 and the control circuitry continues to monitor the video feed of the event to detect an entity.

If an entity is detected at step 304, the process proceeds to step 312. In some embodiments, steps 312-318 and steps 306-308 are performed in parallel. For instance, the control circuitry of the server computer may monitor and analyze the video feed of the event to detect and analyze actions while a prompt is displayed on a user device and the user performs the predictive movement.

At step 306, the control circuitry determines whether the detected entity performs an action in the video feed. For example, the control circuitry may continually track the entity in the video data to determine whether an action is performed by the entity. An action determination may include a determination that the entity moved in the video data for more than a threshold period of time and/or that the entity performed a threshold number of movements in the video data. For instance, if the video feed displays a soccer player that is detected by the control circuitry, but the video feed cuts to a different view that does not include the soccer player, the control circuitry may determine that an action was not detected. In contrast, if the video feed includes five seconds of motion of the entity and a stored threshold period of time is two seconds, the control circuitry may determine that an action has been performed. If no action is detected, the process reverts back to step 302 and control circuitry of the server computer continues to monitor the video feed of the event to detect an entity. In some embodiments, the control circuitry further sends instructions to a display device to remove a displayed prompt and/or display a notification that a predictive movement cannot be performed for the entity.

If an action is detected at step 306, at step 308, the control circuitry of the server computer analyzes the action. For example, the control circuitry may use computer vision techniques to determine motions of different body parts of the entity to perform an action. As another example, the control circuitry may analyze visual effects in a video feed of a video game to determine which moves were performed by a character in the video game. The control circuitry may store in memory data identifying individual movements performed as part of the action.

At step 312, if an entity is detected in step 304, the control circuitry of the server computer generates for display a prompt for a user to perform a predictive movement. The control circuitry of the server computer transmits the prompt to a display device to display the prompt concurrently with a video feed of the event. The prompt may identify the entity for which the predictive movement is to be performed, such as by naming the entity or circling the entity in the video feed. In some embodiments, the control circuitry of the server computer pauses playback of the live stream of the event while the predictive movement is performed.

At step 314, control circuitry of the server computer monitors the video feed of the user to determine if the user performs a predictive movement. For example, the control circuitry may analyze the video feed to determine whether the video feed includes the user performing movements within a particular time window, such as within two seconds of display of the prompt.

At step 316, control circuitry of the server computer determines whether a predictive movement has been detected. If a predictive movement has not been detected, such as because a user did not perform any movements or a user was not in a frame of a camera capturing video of an area proximate to the display device, the process reverts to step 302 and the control circuitry of the server computer monitors the video feed of the event for another entity.

At step 318, if a movement is detected, control circuitry of the server computer analyzes the movement of the user. For example, the control circuitry may use computer vision techniques to identify a plurality of individual movements of body parts of the user during a predictive movement time window. The control circuitry may store in memory data identifying individual movements performed by the user as part of the predictive movement.

At step 320, control circuitry of the server computer determines whether the movement of the user matches the action of the entity. For example, the server computer may determine whether each movement of the user matches each movement of the entity, whether a threshold number of movements of the user match actions of the entity, and/or if the movements of the user have at least a threshold level of similarity to the movements of the entity. If at step 320, control circuitry of the server computer determines that the movement of the user matches the movements of the entity, at step 322, the control circuitry of the server computer identifies the predictive movement as a correct prediction. If at step 320, control circuitry of the server computer determines that the movement of the user does not match the movements of the entity, at step 324, control circuitry of the server identifies the predictive movement as an incorrect prediction.

After step 322 or step 324, the process reverts back to step 302, and control circuitry of the server computer monitors the video feed of the event to detect an entity. In some embodiments, the control circuitry further causes display of an indication as to whether the prediction is correct. The display may include video of the action being performed by the entity and/or video of the predictive movement performed by the user. The control circuitry may additionally determine a reward based on whether the predictive movement was identified as a correct prediction.

Figure 4:
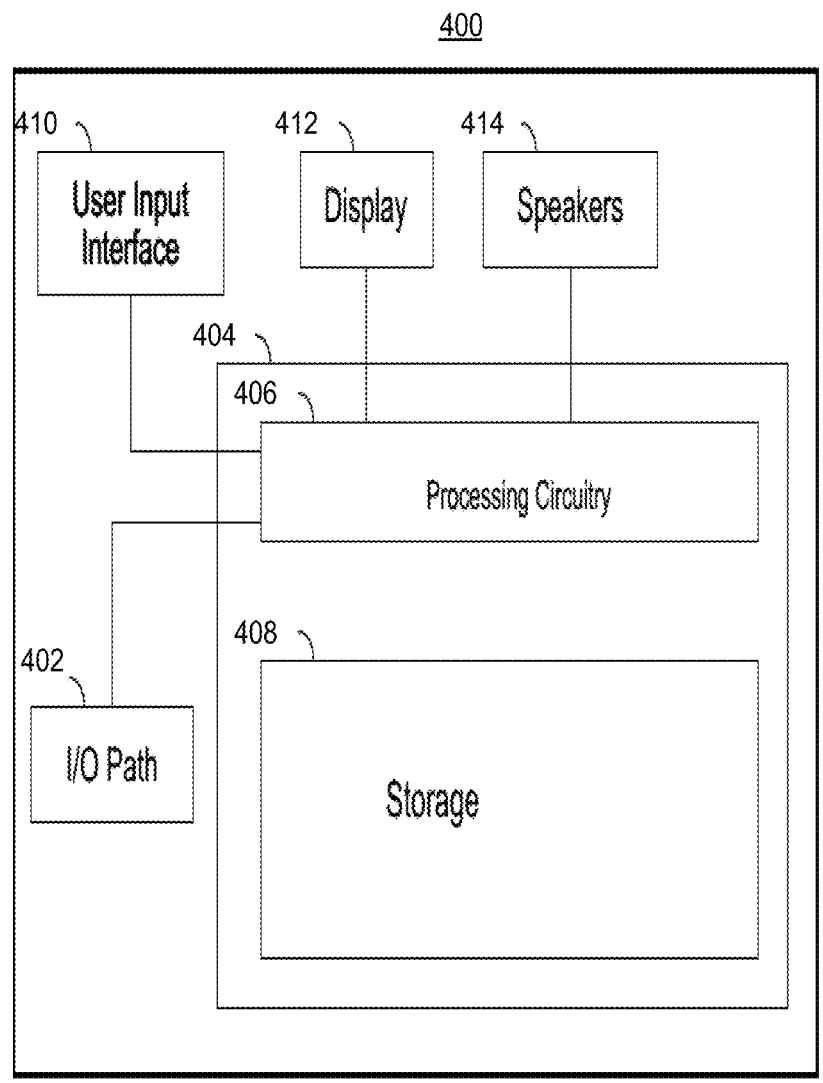
FIG. 4 depicts a block diagram of an illustrative media system, in accordance with some embodiments of the disclosure.

FIG. 4 depicts a generalized embodiment of an illustrative device (e.g., display device 140 or server 150) that analyzes and compares predictive movements of a user with actions performed by an entity that are displayed to the user after performance of the predictive movement by the user. Device 400 may be any of a plurality of user devices such as a smartphone, tablet, personal computer, set-top box, server computer, etc. (discussed further below with respect to FIG. 5). Device 400 may receive video streams via input/output ("I/O") path 402. I/O path 402 may provide video streams, application updates, or other data to control circuitry 404, which includes processing circuitry 406 and storage 408. Control circuitry 404 may be used to send and receive commands, requests, and other suitable data using I/O path 402. I/O path 402 may comprise circuitry that connects control circuitry 404 (and specifically processing circuitry 406) to one or more communications paths (described below in relation to FIG. 5). I/O functions may be provided by one or more of these communications paths but are shown as a single path in FIG. 4 to avoid overcomplicating the drawing. I/O path 402 may comprise circuitry for transmitting messages over network 514 of FIG. 5, for example, when directed by control circuitry 404 to transmit said messages. In some embodiments, I/O path 402 may comprise circuitry that includes wires and/or busses connected to a physical network port, e.g. an ethernet port, a wireless WiFi port, cellular communication port, or any other type of suitable physical port.

Control circuitry 404 may be based on any suitable processing circuitry such as processing circuitry 406. Processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., quad-core). In some embodiments, processing circuitry may be distributed across multiple separate processor or processing units, for example, multiple of the same type of processing units (e.g., two Intel Core i7 processors) or multiple different processors (e.g., Ryzen processor with integrated CPU and GPU processing cores) or may include a multi-core processor (e.g., dual-core, quad-core, hexa-core, or any suitable number of cores) or supercomputer. In some embodiments, control circuitry 404 executes instructions for an application stored in memory (e.g., storage 408). In some implementations, any action performed by control circuitry 404 may be based on instructions received from an application executing on device 400.

The circuitry described herein, including, for example, tuning, audio-generating, encoding, decoding, encrypting, decrypting, scaler, and analog/digital circuitry, may be implemented using software running on one or more general purpose or specialized processors. If storage 408 is provided as a separate device from user equipment device 400, the tuning and encoding circuitry may be associated with storage 408.

Storage 408 may be any device for storing electronic data, such as random-access memory, solid state devices, quantum storage devices, hard disk drives, non-volatile memory or any other suitable fixed or removable storage devices, and/or any combination of the same. Control circuitry 404 may allocate portions of storage 408 for various purposes such as caching application instructions, recording media assets, storing portions of a media asset, buffering segments of media, etc. As described herein, storage 408 may be used to store one or more LUTs storing a number of MAC addresses associated with a plurality of user equipment devices and their corresponding profile information.

A user may send instructions to control circuitry 404 using user input interface 410. User input interface 410 may be any suitable user input interface, such as a remote control, mouse, trackball, keypad, keyboard, touchscreen, touchpad, stylus input, joystick, voice recognition interface, or other user input interfaces. Instructions to control circuitry 404 may be transmitted through I/O path 402, which could consist of a video tracking and detection mechanism, Internet of Things (IoT) and home automation triggers, emergency alert systems, and software or hardware communication pipelines and/or notification centers.

Display 412 may be provided as a stand-alone device or integrated with other elements of each one of user equipment device 400. For example, display 412 may be a touchscreen or touch-sensitive display, a projector, or a casting device. In such circumstances, user input interface 410 may be integrated with or combined with display 412. Display 412 may be one or more of a monitor, a television, a liquid-crystal display (LCD) for a mobile device, silicon display, e-ink display, light-emitting diode (LED) display, or any other suitable equipment for displaying visual images. Graphics processing circuitry may generate the output to the display 412. In some embodiments, the graphics processing circuitry may be external to processing circuitry 406 (e.g., as a graphics processing card that communicates with processing circuitry 406 via I/O path 402) or may be internal to processing circuitry 406 or control circuitry 404 (e.g., on a same silicone die as control circuitry 404 or processing circuitry 406). In some embodiments, the graphics processing circuitry may be used to receive, display, and play content.

Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414. The speakers 414 may be part of, but not limited to, a home automation system.

Streaming applications may be, for example, stand-alone applications implemented on user devices. For example, the streaming application may be implemented as software or a set of executable instructions, which may be stored in non-transitory storage 408 and executed by control circuitry 404 of a user device 502, 504, 506. In such an approach, instructions of the streaming application are stored locally (e.g., in storage 408), and data for use by the application is downloaded on a periodic basis (e.g., from an out-of-band feed, from an Internet resource, or using another suitable approach). Control circuitry 404 may retrieve instructions of the streaming application from storage 408 and process the instructions to generate any of the displays discussed herein. Based on the processed instructions, control circuitry 404 may determine what action to perform when user input is received from input interface 410.

Figure 5:
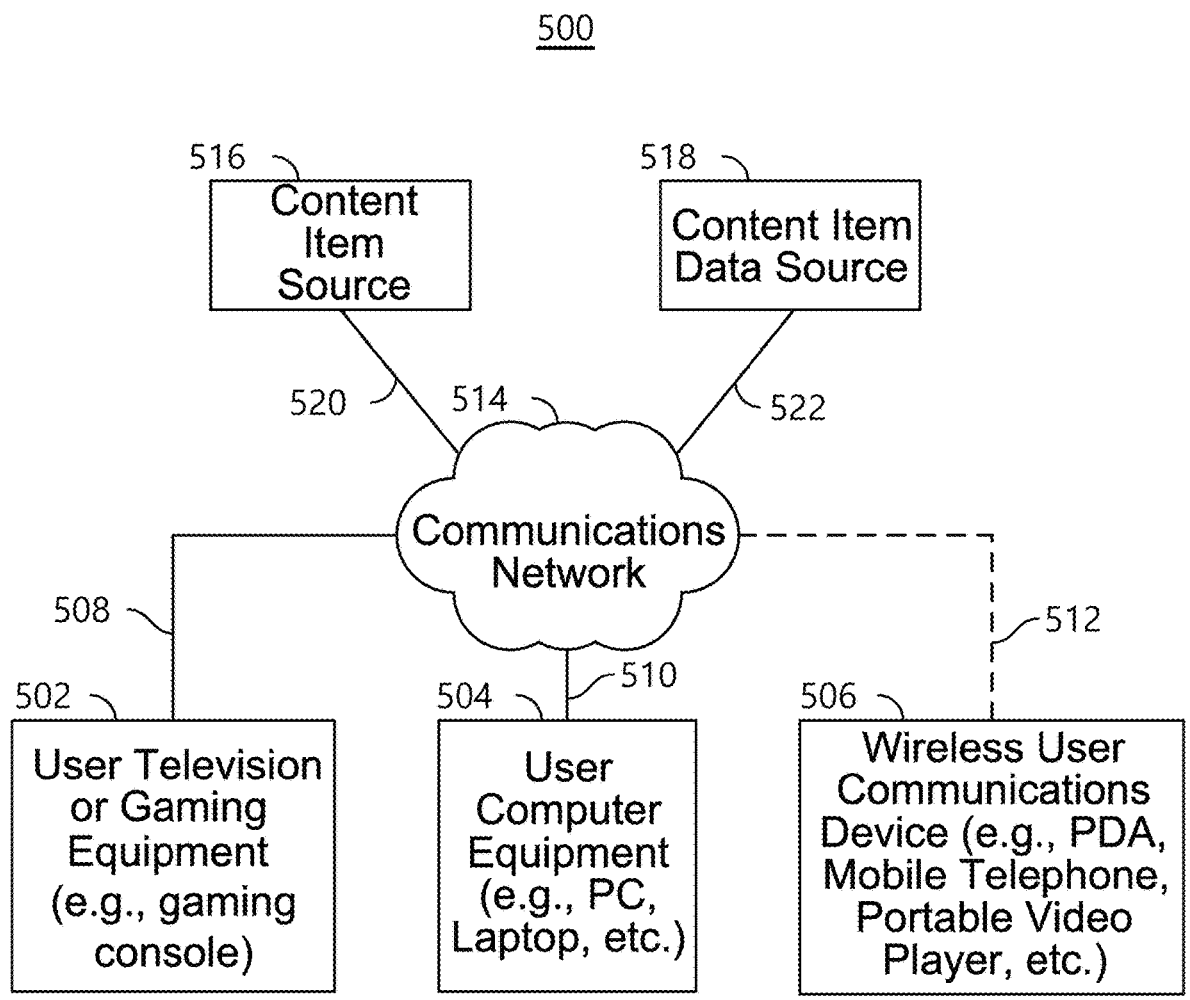
FIG. 5 depicts an exemplary media system in accordance with some embodiments of the disclosure.

FIG. 5 depicts an exemplary media system in accordance with some embodiments of the disclosure, in which server 150 and/or device 140 can be implemented in the media system 500 of FIG. 5 as user television equipment 502, user computer equipment 504, wireless user communications device 506, or any other type of user equipment suitable for accessing media. For simplicity, these devices may be referred to herein collectively as user equipment or a user device. User equipment, on which the media application or the streaming application is implemented, may function as a stand-alone device or may be part of a network of devices. Various network configurations of devices may be implemented and are discussed in more detail below.

User television or gaming equipment 502 may include a set-top box, an integrated receiver decoder (IRD) for handling satellite television, a television set, a digital storage device, personal computer, or other user television or gaming equipment. One or more of these devices may be integrated to be a single device, if desired. User computer equipment 504 may include a PC, a laptop, a streaming content aggregator, a PC media center, or other user computer equipment. It may include devices like digital assistants, smart speakers, and/or home automation. Wireless user communications device 506 may include a smartphone, a portable video player, a portable music player, a portable gaming machine, a tablet, a wireless streaming device or other wireless device. It should be noted that the lines are blurred when trying to classify a device as one of the above devices, and one device may be categorized into one or more of the categories listed above.

In system 500, there are typically more than one of each type of user equipment, but only one of each is shown in FIG. 5 to avoid overcomplicating the drawing. In addition, each user may utilize more than one type of user equipment (e.g., a user may have a computer and a tablet) and also more than one of each type of user equipment device (e.g., a user may have multiple television sets).

The user equipment may be coupled to communications network 514. Namely, user television equipment 502, user computer equipment 504, and wireless user communications device 506 are coupled to communications network 514 via communications paths 508, 510, and 512, respectively. Communications network 514 is used by the user equipment to obtain the video stream. Communications network 514 may be one or more networks including the Internet, a mobile phone network, ad-hoc network, or other types of communications network or combination of communications networks. Paths 508, 510, and 512 may separately or together include one or more communications paths, including any suitable wireless communications path. Path 512 is drawn as a dotted line to indicate it is a wireless path. Communications with the user equipment may be provided by one or more of these communications paths but are shown as a single path in FIG. 5 to avoid overcomplicating the drawing. The user equipment devices may communicate with each other directly through an indirect path via communications network 514.

System 500 includes content item source 516 and content item data source 518 coupled to communications network 514 via communications paths 520 and 522, respectively. Paths 520 and 522 may include any of the communications paths described above in connection with paths 508, 510, and 512. Communications with the content item source 516 and content item data source 518 may be exchanged over one or more communications paths but are shown as a single path in FIG. 5 to avoid overcomplicating the drawing. In addition, there may be more than one of each of content item source 516 and content item data source 518, but only one of each is shown in FIG. 5 to avoid overcomplicating the drawing. In some embodiments, content item source 516 and content item data source 518 are integrated as one source device. Although communications between sources 516 and 518 with user equipment are shown as through communications network 514, in some embodiments, sources 516 and 518 may communicate directly with user equipment devices 502, 504, and 506 via communications paths (not shown) such as those described above in connection with paths 508, 510, and 512.

Content item source 516 or content item data source 518 may include one or more types of media distribution equipment such as a media server, cable system headend, satellite distribution facility, intermediate distribution facilities and/or servers, Internet providers, on-demand media servers, and other media providers. Content item source 516 or content item data source 518 may be the originator of media content or may not be the originator of media content. Content item source 516 or content item data source 518 may also include a remote media server used to store different types of media content (including a media asset selected by a user), in a location remote from any of the user equipment. Systems and methods for providing remotely stored media to user equipment are discussed in greater detail in connection with Ellis et al., U.S. Pat. No. 7,761,892, issued Jul. 20, 2010, which is hereby incorporated by reference herein in its entirety.

System 500 is intended to illustrate a number of approaches, or network configurations, by which user equipment devices and sources of media content and guidance data may communicate with each other for the purpose of accessing media and data related to the media. The configuration of the devices and paths in system 500 may change without departing from the scope of the present disclosure.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods. For example, the processes FIGS. 1-3 can be performed on any of the devices shown in FIGS. 4-5. Additionally, any of the steps in processes of FIGS. 1-3 can be performed in any order, can be omitted, and/or can be combined with any of the steps from any other process.

What is claimed is:

1. A method comprising:
    identifying, in a video feed being transmitted to a display device, an entity;
    generating, for display on the display device, an invitation to perform a predictive movement, the predictive movement comprising one or more movements that a user proximate to the display device predicts the entity will perform as part of an action;
    detecting performance of the predictive movement by the user prior to the display device displaying performance of the action by the entity; and
    determining that the predictive movement performed by the user matches the action performed by the entity and, in response, storing data indicating a correct prediction by the user.

2. The method of claim 1, wherein the entity is a player in a sports broadcast, and wherein determining that the predictive movement performed by the user matches the action performed by the entity comprises:
    using a first machine learning system, detecting a plurality of motions of a plurality of body parts of the player in the sports broadcast during the performance of the action;
    using a second machine learning system, detecting a plurality of motions of a plurality of body parts of the user during the predictive movement; and
    comparing the plurality of motions of the plurality of body parts of the player with the plurality of motions of the plurality of body parts of the user to determine that the predictive movement matches the action.

3. The method of claim 1, wherein the entity is a computer-generated character in a video game that is being played at a location separate from the display device, and wherein determining that the predictive movement performed by the user matches the action performed by the entity comprises:
    identifying a first plurality of inputs received to control the character in the video game to cause the performance of the action that is transmitted to and displayed at the display device;
    identifying a second plurality of inputs received from the user to cause the performance of the predictive movement; and
    comparing the first plurality of inputs with the second plurality of inputs to determine that the predictive movement matches the action.

4. The method of claim 3, wherein identifying the first plurality of inputs received to control the character in the video game to cause the performance of the action comprises:
    analyzing video data of the video game to identify particular graphical effects;
    identifying one or more abilities of the entity that correspond to the particular graphical effects; and
    identifying the first plurality of inputs as inputs that cause performance of the one or more abilities of the entity.

5. The method of claim 1, further comprising generating, for display on the display device, a scoreboard identifying one or more other users and a score indicative of a number of correct predictions for the one or more other users.

6. The method of claim 1, further comprising generating, for display on the display device, a highlight comprising a video of a particular user performing a particular predictive movement.

7. The method of claim 6, wherein the generating, for display on the display device, the highlight is performed in response to determining that the particular user's particular predictive movement comprises a correct prediction.

8. The method of claim 1, wherein the determining that the predictive movement performed by the user matches the action performed by the entity comprises:
    determining a level of similarity between the predictive movement and the action performed by the entity; and
    determining that the level of similarity is greater than a stored threshold value and, in response, determining that the predictive movement performed by the user matches the action performed by the entity.

9. The method of claim 8, further comprising generating a score based on the level of similarity between the predictive movement and the action performed by the entity.

10. The method of claim 1, further comprising:
    generating an action table comprising identifiers of a plurality of body movements that make up the action performed by the entity; and
    generating a predictive movement table comprising identifiers of a plurality of body movements that make up the predictive movement;
    wherein the determining that the predictive movement performed by the user matches the action performed by the entity comprises comparing the action table to the predictive movement table.

11. A system comprising:
    input/output circuitry configured to receive a video feed that is transmitted to a display device;
    control circuitry configured to:

identify, in the video feed, an entity;
generate, for display on the display device, an invitation to perform a predictive movement, the predictive movement comprising one or more movements that a user proximate to the display device predicts the entity will perform as part of an action;
detect performance of the predictive movement by the user prior to the display device displaying performance of the action by the entity; and
determine that the predictive movement performed by the user matches the action performed by the entity and, in response, store data indicating a correct prediction by the user.

12. The system of claim 11, wherein the entity is a player in a sports broadcast and wherein, when determining that the predictive movement performed by the user matches the action performed by the entity, the control circuitry is further configured to:
using a first machine learning system, detect a plurality of motions of a plurality of body parts of the player in the sports broadcast during the performance of the action;
using a second machine learning system, detect a plurality of motions of a plurality of body parts of the user during the predictive movement; and
compare the plurality of motions of the plurality of body parts of the player with the plurality of motions of the plurality of body parts of the user to determine that the predictive movement matches the action.

13. The system of claim 11, wherein the entity is a computer-generated character in a video game that is being played at a location separate from the display device and wherein, when determining that the predictive movement performed by the user matches the action performed by the entity, the control circuitry is further configured to:
identify a first plurality of inputs received to control the character in the video game to cause the performance of the action that is transmitted to and displayed at the display device;
identify a second plurality of inputs received from the user to cause the performance of the predictive movement; and
compare the first plurality of inputs with the second plurality of inputs to determine that the predictive movement matches the action.

14. The system of claim 13, wherein, when identifying the first plurality of inputs received to control the character in the video game to cause the performance of the action, the control circuitry is further configured to:

analyze video data of the video game to identify particular graphical effects;
identify one or more abilities of the entity that correspond to the particular graphical effects; and
identify the first plurality of inputs as inputs that cause performance of the one or more abilities of the entity.

15. The system of claim 11, wherein the control circuitry is further configured to generate, for display on the display device, a scoreboard identifying one or more other users and a score indicative of a number of correct predictions for the one or more other users.

16. The system of claim 11, wherein the control circuitry is further configured to generate, for display on the display device, a highlight comprising a video of a particular user performing a particular predictive movement.

17. The system of claim 16, wherein the control circuitry is further configured to perform the generating, for display on the display device, the highlight in response to determining that the particular user's particular predictive movement comprises a correct prediction.

18. The system of claim 11, wherein, when determining that the predictive movement performed by the user matches the action performed by the entity, the control circuitry is further configured to:
determine a level of similarity between the predictive movement and the action performed by the entity; and
determine that the level of similarity is greater than a stored threshold value and, in response, determine that the predictive movement performed by the user matches the action performed by the entity.

19. The system of claim 18, wherein the control circuitry is further configured to generate a score based on the level of similarity between the predictive movement and the action performed by the entity.

20. The system of claim 11, wherein the control circuitry is further configured to:
generate an action table comprising identifiers of a plurality of body movements that make up the action performed by the entity; and
generate a predictive movement table comprising identifiers of a plurality of body movements that make up the predictive movement;
wherein, when determining that the predictive movement performed by the user matches the action performed by the entity, the control circuitry is further configured to compare the action table to the predictive movement table.

* * * * *